United States Patent [19]
Shumaker et al.

[11] Patent Number: 5,812,591
[45] Date of Patent: Sep. 22, 1998

[54] DUAL CONVERSION GPS FREQUENCY CONVERTER AND FREQUENCY PLAN FOR SAME

[75] Inventors: Paul K. Shumaker; David D. Casey; Gary L. Burrell, all of Lenexa, Kans.

[73] Assignee: Garmin Corporation, Taiwan

[21] Appl. No.: 311,600

[22] Filed: Sep. 23, 1994

[51] Int. Cl.$^6$ .............................. H04L 27/30; H04B 1/26
[52] U.S. Cl. ......................... 375/206; 375/316; 455/314; 331/22
[58] Field of Search .................................... 375/206, 316; 455/314, 315, 260; 331/22, 31, 51

[56] References Cited

U.S. PATENT DOCUMENTS

| | | |
|---|---|---|
| 3,324,396 | 6/1967 | Schneider . |
| 3,681,697 | 8/1972 | Moroney . |
| 4,203,070 | 5/1980 | Bowles et al. . |
| 4,232,395 | 11/1980 | Yokogawa . |
| 4,247,939 | 1/1981 | Stromswold et al. . |
| 4,249,418 | 2/1981 | Hooper . |
| 4,485,477 | 11/1984 | Nossen . |
| 4,530,103 | 7/1985 | Mosley, Jr. et al. . |
| 4,531,236 | 7/1985 | Ishihara . |
| 4,580,289 | 4/1986 | Enderby ................................. 455/314 |
| 4,627,100 | 12/1986 | Tekano .................................. 455/315 |
| 4,754,465 | 6/1988 | Trimble . |
| 4,970,523 | 11/1990 | Braisted et al. . |
| 5,108,334 | 4/1992 | Eschenback et al. .................... 455/314 |
| 5,239,697 | 8/1993 | Kosuga .................................. 455/315 |
| 5,307,515 | 4/1994 | Kuu et al. ............................. 455/313 |
| 5,329,546 | 7/1994 | Lee ....................................... 375/206 |
| 5,606,736 | 2/1997 | Hasler et al. .......................... 455/314 |

OTHER PUBLICATIONS

Relating to the Efficiency of Utilization of the Geostationary Orbit/Spectrum in the Fixed–Satellite Service, Hans J. Weiss, Proceedings of the IEEE, vol. 68, No. 12, Dec. 1980, pp. 1484–1496.

GPS Time Transfer, Wlodzimierz Lewandowski and Claudine Thomas, Proceedings of the IEEE, vol. 79, No. 7, Jul. 1991, pp. 991–999.

Theory of Spread–Spectrum Communications—A Tutorial, Raymond L. Pickholtz, DOnald L. Schilling, and Laurence B. Milstein, IEEE Trans. Commun., vol. COM–30, pp. 855–884, May 1982.

An Advanced Navstar GPS Multiplex Receiver, Phil Ward, 1980 IEEE, pp. 51–19.

Land Navigation With A Low Cost GPS Receiver, Kai P. Yiu, Ralph Eschenbach and Frank Lee, 1980 IEEE, pp. 55.3.1–55.3.7.

Collins Avionics Navstar GPS Advanced Digital Receiver, John W. Murphy and Michael D. Yakos, Collins Government Avionics Division, Rockwell International Corporation, pp.107–117.

An Advanced Microprocessor–Controlled GPS Time Transfer System, Roger McLean and Quyetn D. Hua, Stanford Telecommunications, Inc., pp. 142–148.

*Primary Examiner*—Temesghen Ghebretinsae
*Attorney, Agent, or Firm*—Shook, Hardy & Bacon L.L.P.

[57] ABSTRACT

A GPS frequency converter is provided, according to the present invention, to down-convert the frequency of an incoming GPS signal. The converter includes first and second mixers, the former of which receives the incoming RF signal and a signal from a local oscillator. The local oscillator signal is increased by a factor of 98 and then subtracted from the incoming RF signal to produce a first intermediate frequency signal (IF). The first IF signal is then passed to the second mixer which subtracts the frequency of the local oscillator therefrom to produce a second intermediate frequency signal (IF). The second IF signal is passed through a limiter and output as the frequency converted signal.

19 Claims, 3 Drawing Sheets

DUAL CONVERSION GPS FREQUENCY CONVERTER AND FREQUENCY PLAN FOR SAME

FIELD OF THE INVENTION

The present invention relates to a dual conversion frequency converter for a super heterodyne receiver of the type which receives spread spectrum signals from a global positioning satellite (GPS) and, more particularly, to a converter for transforming the spread spectrum GPS frequency to a desired base band frequency.

BACKGROUND OF THE INVENTION

Receivers have been proposed in the past for use with a NAVSTAR global positioning system (GPS) which constitutes a satellite based radio-navigation system, each satellite of which transmits information to earth-based receivers. The receivers utilize this information to compute accurate navigational information. The GPS system employs multiple satellites disbursed in orbits about the earth to provide worldwide service. Each satellite transmits a L-band carrier signal, L1, having a frequency of 1575.42 MHz. Additional signals are also transmitted but are not needed or used by this type of receiver. The L-1 signal is bi-phase modulated by pseudo random noise (PRN) codes which facilitate multiple access thereto and facilitate signal transit time measurements. This type of receiver uses clear/acquisition (C/A) PRN code. The C/A PRN code is intended for rapid signal acquisition and for commercial purposes. The C/A PRN code represents a relatively short code having a clock rate of 1.023 MHz and a code length of 1,023 bits.

In order for a commercial device to receive navigation information within the carrier signal L-1 from a GPS satellite, the receiver must be able to phase and frequency track the C/A PRN code. To afford such tracking, a sufficient number of samples must be taken from the received signal. In the instant environment, the C/A code must be sampled at a rate greater than the chipping rate for the code information (1.023 MHz). Some processing advantage is obtained if it is over sampled by at least four times the code rate (i.e., 4.092 MHz). Certain GPS receivers provide an even greater sampling rate to obtain further benefits of over sampling. Some receivers, particularly those of the type contemplated for use with the instant invention, operate with a sampling rate of sixteen times the code rate (i.e., 16 $f_O$ where $f_O$=1.023 MHz; or 16.368 MHz). However, many multiples of the sampling frequency may be effective provided there is proper filtering of the input signals to be sampled.

Receivers of the type for use with the present invention convert the signal input frequency to a lower intermediate frequency (IF) where amplification, filtering, limiting and sampling can be done with less power and cost. This process converts the frequency of the input signal to the difference of the input signal and a mixer's reference frequency. Two such frequency conversions are provided in the instant invention through cascaded mixers. The reference frequency for the first mixer (1604.064) may be set 28.644 MHz higher than the desired input signal frequency (1575.42 MHz), and thus the first conversion is to a frequency (1604.064−1575.42 MHz=28.644 MHz). If the input frequency is increased, the first conversion frequency will decrease by the same amount. This also implies that a phase change in the input signal will cause a phase change in the same number of cycles in the output signal but of opposite direction.

In the second frequency conversion the reference frequency is 16.368 MHz, the input frequency is the output frequency of the first conversion (28.644 MHz), and the output frequency is (28.644−16.368 MHz=12.276 MHz). In this case, the signal input frequency is higher than the reference frequency. The general principals of how to achieve frequency conversions are widely used and well explained in existing literature. The 12.276 MHz output of this converter was selected for the instant invention for use with a 16.368 MHz sampling process. The 16.368 MHz frequency was chosen to simplify the generation of the C/A PRN code used in the demodulation process. The C/A code chip rate is 1.023 MHz and the sampling frequency is 16*1.023. The C/A code phase can be adjusted to have chip transitions between any two samples. The sample rate is also constrained by the bandwidth of the desired signal and practical considerations of building the required frequency band limiting filters. Since most of the desired signal energy is within a frequency band width equal to the chipping rate (1.023 MHz), the band-limiting filters should pass at least these frequencies.

Periodic samples of a signal are identical if the frequency of the sampled signal is shifted in frequency by an integral multiple of the sample rate. Thus, if the sampled signal contains frequencies that are equal to frequencies in the desired signal plus or minus an integral multiple of the sample frequency, these other frequency components will interfere with measurement of the desired signal. This implies that the filter should attenuate these potentially interfering frequencies. Higher sample rates increase the difference between these interfering frequencies and the desired signal. Increasing this difference relative to the frequency range that passes through the filter makes the filters easier and less expensive to build. Excessively high sample rates increase the power used and make the sampler more expensive. In the present system, the 16.368 MHz sampling frequency provides the proper balance of benefits and cost.

The samples are used to estimate the amplitude, phase, and frequency of the received signal. If the output frequency of the converter is chosen to be any integral multiple of the sample frequency plus or minus one fourth the sample frequency, it can be seen that each sample will be at a phase advanced or retarded by one fourth of a cycle of the input signal frequency. This is desirable since in-phase and quadrature phase components of the signal relative to the sample clock may easily be measured with the even and odd samples respectively.

The GPS signal C/A PRN code modulation is generated synchronously with the carrier frequency such that 1540 cycles of the carrier are one chip of the code. Thus it is possible to measure the change in the carrier phase relative to the sample clock and predict the change of the code phase relative to the sample clock. This aids the accuracy of the code phase measurements which are also measured relative to the sample clock. The code phase is determined by the time at which a phase reversal occurs in the signal. This is not affected by the frequency conversion. The phase of the carrier in the output of the converter however would be changed if the phase of the reference frequency for either mixer changed relative to the sample clock. The converter however derives both reference frequencies by selecting harmonics of the sample clock. This effectively assures that a phase shift of 1540 cycles in the output of the converter corresponds to a code phase shift of one chip just as in the transmitted signal. As noted above, the first mixer reverses the direction of carrier phase shift but this is easily accounted for after the sampler.

Receivers, which must satisfy the foregoing criteria and which are confined by practical technology limitations to processing signals of 30 MHz or less, necessitate conversion of the GPS signal frequency to a base band frequency B which satisfies the following equation:

B=(16.368)(K)±(4(1.023))<30;

where K is an integer and 16.368 is the sampling rate. In other words the base band frequency B must be less than 30 MHz but still offset, from a multiple of the sampling rate, by four times the code rate. Solutions for the base band frequency B are 12.276 MHz, 20.460 MHz and 28.644 MHz. Thus, a converter is needed which is able to convert the GPS signal to a base band signal having one of the three foregoing frequencies.

One previously proposed down converter is disclosed in U.S. Pat. No. 4,754,465 to Trimble. Trimble's down converter utilized a single step to reduce the GPS L-1 frequency to a base band frequency. Trimble discloses a balanced mixer driven by a half-frequency local oscillator. The down converted satellite signal is converted from analog-to-digital form by a hard limiter.

The specific scheme of the present invention satisfies the requirements with a simple frequency multiplier for reference frequency generation and uses an efficient frequency doubling mixer. It minimizes generation of frequencies that interfere with the intermediate frequency amplifiers. It also provides a sufficiently high frequency first IF to allow rejection of interfering noise and signals by the RF filters without requiring a more complicated and expensive image reject mixer.

SUMMARY OF THE INVENTION

A GPS frequency conversion system according to the present invention provides a frequency plan having a spurious frequency response which necessitates minimal filtering. The instant frequency converter affords such a plan while minimizing the power requirement therefor and the noise generated therein. The converter includes a band pass filter which receives an input signal at a RF frequency of 1540 $f_O$ (1575.42 MHz). A local oscillator produces a mixing signal at a LO frequency $f_{LO}$. The oscillator output is passed through first and second multipliers, each of which increase the frequency of the incoming signal by seven times (i.e. 7 $f_{LO}$ and 49 $f_{LO}$). The outputs of the multipliers are passed to a mixer which outputs a signal having a frequency equal to the difference between the frequency of the input signal $f_{RF}$ and the frequency of the second harmonic (×2) of the LO signal passed from the multipliers (49 $f_{LO}$) to form an intermediate frequency signal ($f_{IF}$=1540 $f_O$−98 $f_{LO}$) as an output. The output of the first mixer $f_{IF}$ is again mixed in a second mixer with a signal from the local oscillator $f_{LO}$ to produce a second intermediate frequency signal $f_{IF2}$ having a frequency equaling the difference between the first intermediate frequency and the frequency of the local oscillator ($f_{IF2}=f_{IF}-f_{LO}$). The second intermediate frequency signal is passed as the base band signal B, while the output of the local oscillator is passed as a clock reference signal.

The present invention affords a converter design which minimizes the number of components, the power consumption, and the space requirements therefor. The instant converter also provides a frequency response, for which the intermodulation products of concern are spaced along the frequency domain either extremely close to, or at a substantial distance from, the spread spectrum bandwidth at which GPS signals are received. The intermodulation products (IP) closest to the GPS bandwidth are of little concern since these frequencies are not authorized for use under federal regulations. Thus, by law transmitters are not allowed to transmit signals at these closest IP frequencies. The only signals occurring at these closest IP frequencies represent harmonics from signals transmitted at lower frequencies. The instant invention is able to minimize the parts by minimizing the mixer stages (two stages) and by using two low power simple multipliers to deliver an extremely large LO frequency signal to the first mixer. The instant converter further minimizes jamming/interference by choosing a LO frequency above the RF signal frequency and mixer design having harmonic frequencies spaced a substantial difference away from the desired IF frequency.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
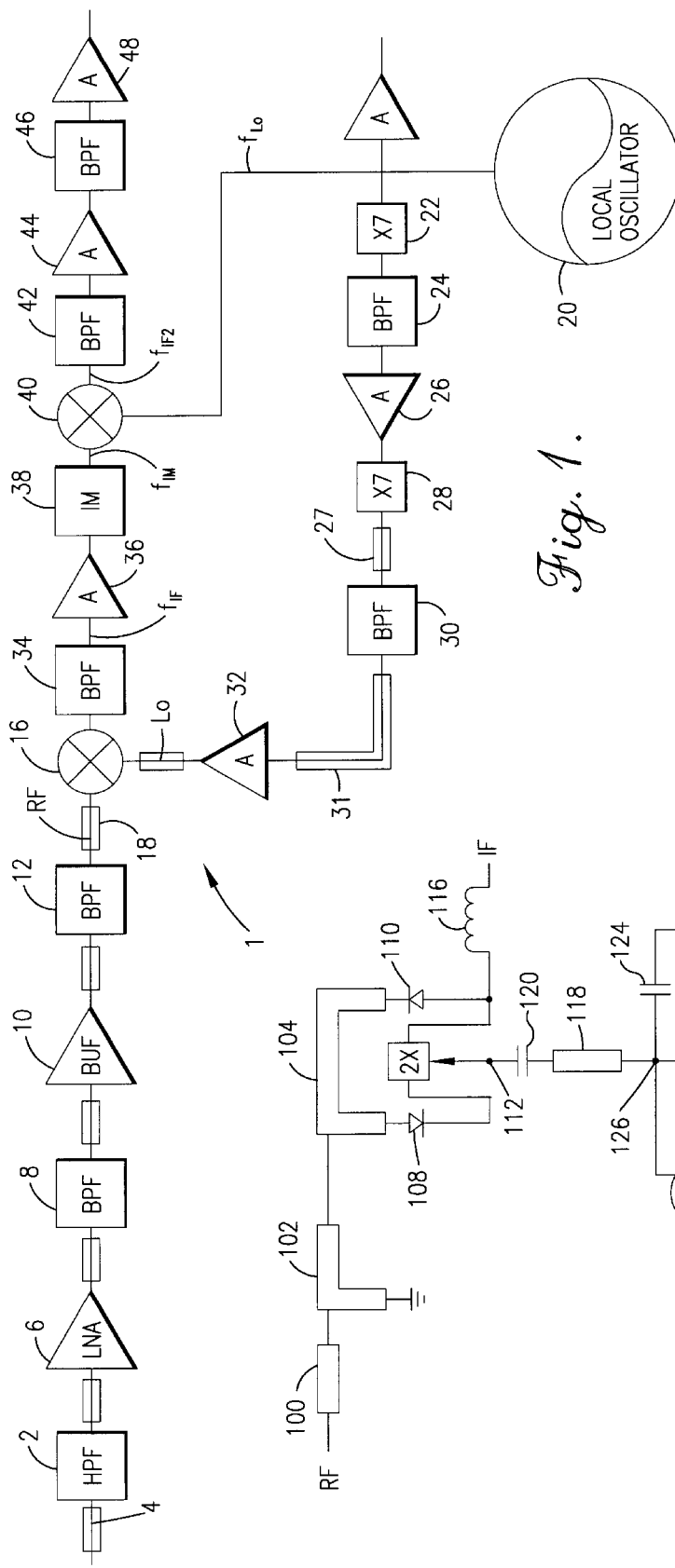
FIG. 1 illustrates a block diagram of a dual conversion down converter according to the present invention.

FIG. 1 generally illustrates a down converter designated by the reference numeral 1. The converter 1 includes a high pass filter 2 which receives the input signal (including the RF signal having a carrier frequency of 1540 $f_O$.) from a transmission line 4 connected to an antennae (not shown). The high pass filter 2 affectively suppresses the signals within the input signal RF having a frequency below a desired threshold, such as 1400 MHz. The output thereof is supplied through a transmission line to a low noise amplifier (LNA) 6 to boost the incoming filtered signal without adding noise thereto. The LNA 6 may be constructed from a GaAs-MESFET of the type which is designated QFET-0105 to provide a signal gain of 13 db. The output of the LNA 6 is supplied to a band pass filter 8 having a 3 db pass bandwidth of 20 MHz at 1540 $f_O$. The band pass filter 8 may be constructed with ceramic of the type which is designated 4DFA-15758-14. The output of the band pass filter 8 is supplied to a buffer 10 which may be constructed from operational amplifiers of the type designated UPC2747.

The output of the buffer 10 is supplied to a second band pass filter 12 formed from the same type of ceramic as the band pass filter 8. The second band pass filter 12 is connected with the input of a first mixer 16, by way of transmission line 18. The second band pass filter 12 is constructed with a −3 db bandwidth of 30 MHz at 1540 $f_O$. The band pass filter 12 is impedance matched to the mixer by the transmission lines represented by 18 to minimize conversion loss and to optimize the frequency characteristic of the converter. This impedance matching is achieved by setting the transmission lines 18 between the band pass filter 12 and the mixer 16 to desired lengths, to match the mixer input impedance to 50 Ω and terminate the mixer at the IF and LO frequencies. The output of the band pass filter 12 represents a filtered RF signal. The RF signal is supplied to the mixer 16.

The converter 1 further includes a local oscillator 20 which generates a reference signal at a desired frequency, such as 16 $f_O$ or 16.368 MHz. The output of the oscillator 20 is delivered to a multiplier 22 (such as designated TC7WU04FU) which creates multiples of the frequency $f_{LO}$ of the local oscillator signal, including a factor of 7 (7 $f_{LO}$). This multiplication is achieved by amplifying the LO signal with a non-linear gain. The output of the multiplier 22 is supplied to a band pass filter 24 which is constructed to filter out harmonics surrounding the seventh harmonic supplied from the multiplier 22 (e.g., the sixth and eighth harmonics of the signal from the local oscillator 20). The band pass filter 24 may be constructed to provide a −3 db bandwidth of 6 MHz of 7 $f_{LO}$. The output of the band pass filter 24 is passed through an amplifier 26 to boost its gain and thereafter supplied to a second multiplier 28 which increases the frequency of the input signal by a factor of seven, similar to the first multiplier 22. The output of the second multiplier 28 is passed through a second band pass filter 30 which may be constructed to provide a −3 db bandwidth of 10 MHz at 49 $f_{LO}$. The output of the band pass filter 30 is supplied through an amplifier 32 to provide a LO signal to the mixer 16 having a frequency of 49 $f_{LO}$.

Figure 2:
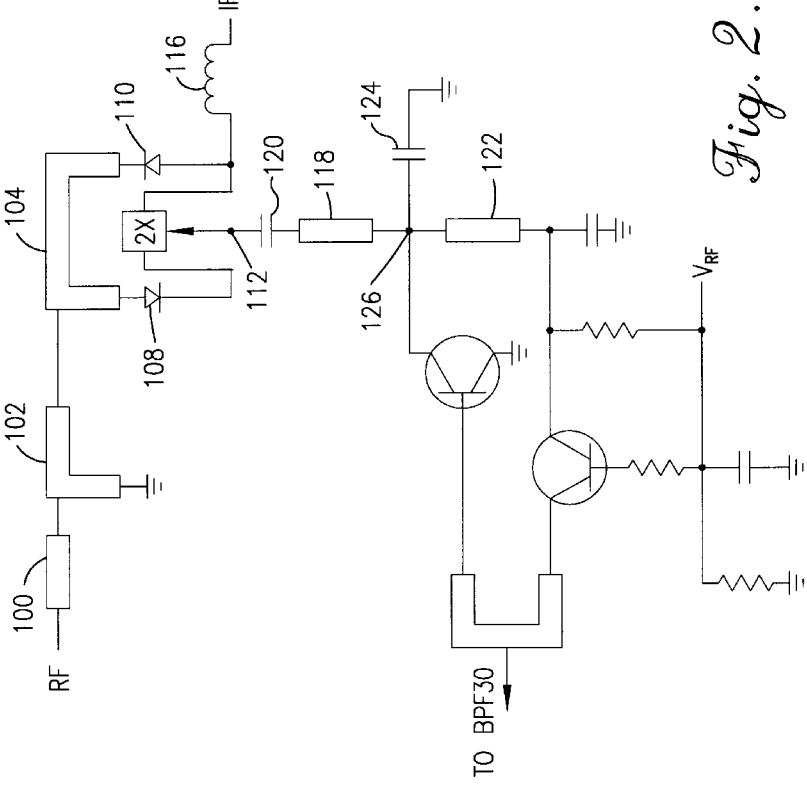
FIG. 2 illustrates a detailed schematic of the first mixer within FIG. 1.

The mixer 16 represents a doubling mixer as illustrated in more detail in FIG. 2. The mixer 16 is connected to an input transmission line 100 having an impedance set to match that of the mixer 16. Within the mixer 16, a transmission line 102 receives the RF signal at an intermediate point therealong from the input transmission line 100. The transmission line 102 is connected at one end to ground and at the opposite end to a branch transmission line 104, at an intermediate point therealong. The branch transmission line 104 is connected at opposite ends to diodes 108 and 110. The branch transmission line 104 is set with a minimum length necessary to connect the anode and cathode of the diodes 108 and 110, such that these diodes act in parallel. Opposite ends of the diodes 108 and 110 are connected to a common node 112. The node 112 receives the LO signal via a transmission line 118 and a capacitor 120 connected in series. A length of the transmission line 118 is set to match the input impedance of the mixer 16. The node 112 is further connected to an inductor 116, from which the IF signal is outputted. The diodes 108 and 110 may be of the type designated MBD352. The foregoing mixer design improves the topology of conventional harmonic mixers for this application by improving the isolation between the RF and LO signals. This isolation enhancement is primarily achieved by interposing the diplexor diodes 108 and 110 between the node 112 (at which the LO signal is received) and the transmission line 100 (at which the RF signal is received). The foregoing mixer design further renders easier impedance matching within the transmission lines 100 and 118.

The amplifier 32 is a tuned amplifier to help to selectively terminate the mixer. The amplifier 32 is tuned to present an open circuit to the RF signal and the IF signal. FIG. 2 further illustrates the amplifier 32 in detail as connected to the transmission line 118. The amplifier 32 affords an inductance, at transmission line 122, which is tuned with a capacitor 124, to achieve a filtering effect. The transmission line 118 serves as a delay element to afford proper impedance matching, along with the capacitor 120, to separate the LO from the RF (i.e. terminate the RF signal at node 126). The capacitor 120 and delay element 118 create a series resonant circuit at the RF pass band which effectively creates a virtual ground at the RF frequency at node 112. This virtual ground provides a low impedance for the RF signal at node 112 thereby forcing the RF signal through the diodes 108 and 110.

A band pass filter 34 is provided on the output side of the mixer 16 to receive the IF signal. The band pass filter 34 functions as an open circuit to the LO signal and the RF signal by nature of its mesh topology.

The doubling mixer 16 is driven by the LO signal from the local oscillator 20, applied thereto via the multipliers 22 and 28 and the band pass filters 24 and 30. The LO signal has a frequency of 49 $f_{LO}$ where $f_{LO}$ represents the frequency of the local oscillator 20. As noted above, the local oscillator 20, by way of example only, may be set at $f_{LO}=16 \times f_O$ where $f_O$ represents the noise code modulation rate of 1.023 MHz. The frequency $f_{RF}$ of the input signal RF, as explained above, is 1540$f_O$ or 1575.420 MHz. The doubling mixer 16 mixes the RF and LO signals and outputs an IF signal having frequency components generally designated by the equation:

$$f_{IF}=|nf_{LO} \pm mf_{RF}|;$$

where n and m may be any integer.

Of the output frequency components, those having the most influence upon the frequency converter are the output signal component $f_{IF}=f_{RF}-f_{LO}$ and the image frequency component $f_{IM}=f_{LO}+f_{IF}$.

The desired output frequency component of those frequency components generated by the mixer 16 is filtered out by the band pass filter 34. The band pass filter 34 is set to limit the IF frequency to a pass band frequency between 4 and 6 MHz in width. The band pass filter 34 is set, such that the center of the pass band is at a frequency $f_{pass\ band}=f_{LO}-f_{RF}$. In this manner, an intermediate frequency IF is obtained equal to the difference between the frequency of the RF signal and the frequency of the second harmonic of the mixing frequency LO. Thereafter, the output of the band pass filter 34 is passed to an amplifier 36 and to an impedance matching circuit 38. The output of the impedance matching circuit 38 represents the first intermediate frequency IF.

The first intermediate frequency IF is supplied to a second mixer 40 which also receives the output from the local oscillator 20. The second mixer 40 produces a second intermediate signal IF2 having a frequency equalling the difference between the frequency of the first IF signal and the local oscillator frequency (i.e., $f_{IM}-f_{LO}$) This output signal IF2 is passed to a band pass filter 42 to improve the filtering characteristic of the output signal and to remove undesirable harmonics therefrom. Next, the output IF2 is supplied to an amplifier 44 and then to a second band pass filter 46 and finally to an amplifier 48. The output of the amplifier 48 represents the BASE BAND signal, having a frequency according to the following equation:

$$f_{Base\ Band}=f_{LO}*2*7*7-(f_{RF})-(f_{LO});$$

where $f_{Base\ Band}$ represents the frequency of the base band output signal, $f_{LO}$ represents the frequency of the local oscillator 20 and $f_{RF}$ represents the frequency of the input signal to the converter.

FREQUENCY PLAN FOR THE PREFERRED EMBODIMENT

Figure 3:
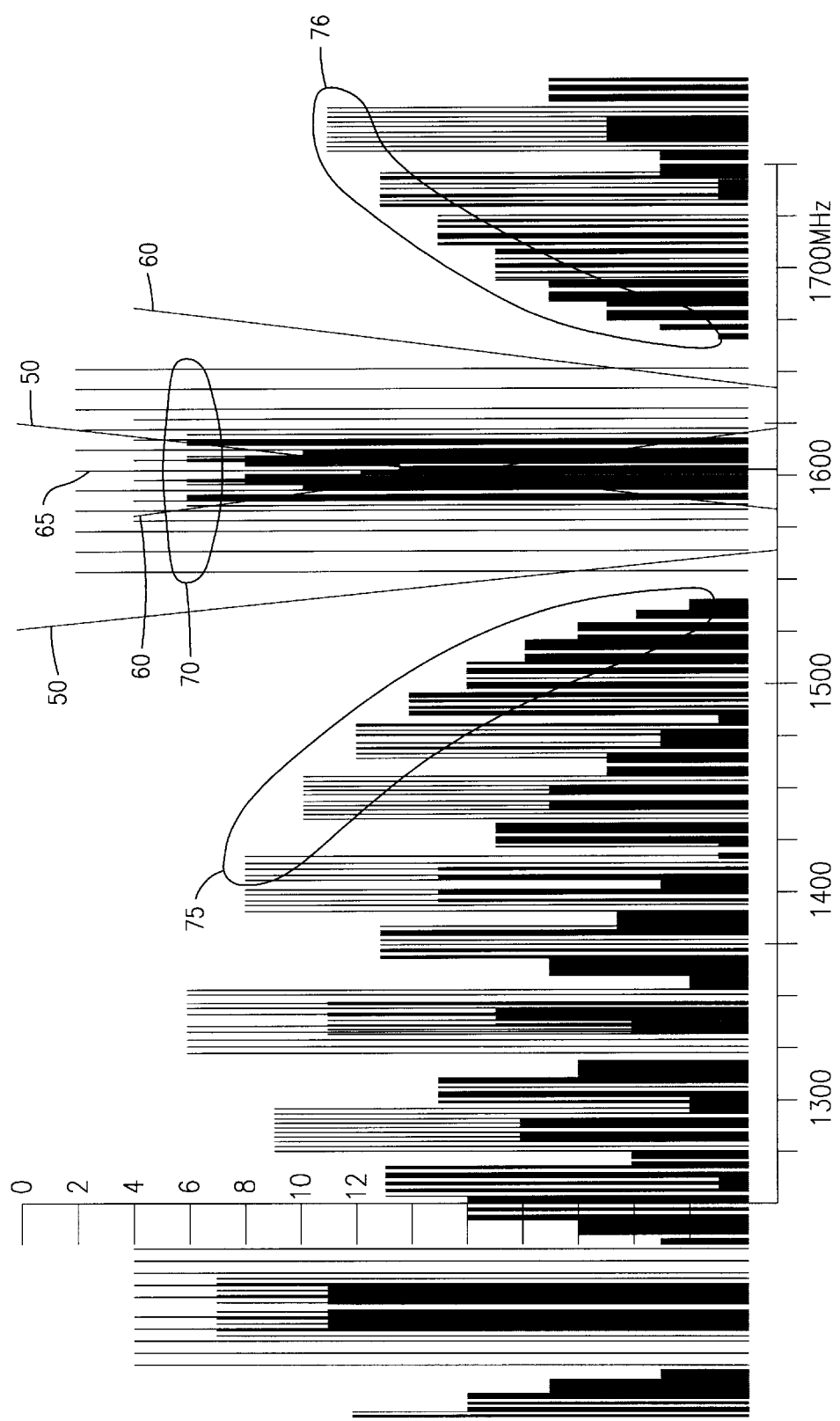
FIG. 3 illustrates a spurious frequency response for the circuit of the block diagram illustrated in FIG. 1.
Figure 4:
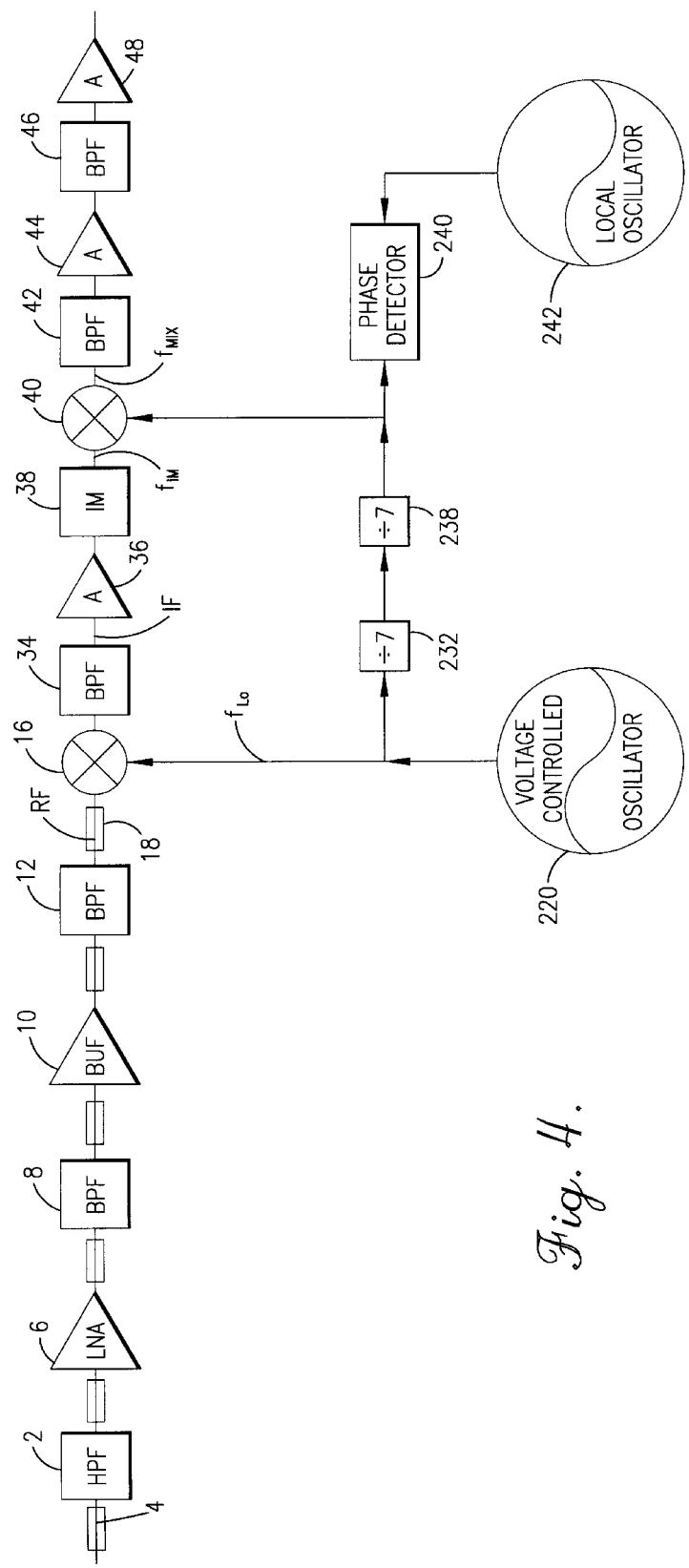
FIG. 4 illustrates a block diagram of a dual conversion down converter according to an alternate embodiment of the present invention having a phase-locked loop.

FIG. 3 illustrates the spurious frequency response afforded the converter circuit illustrated in FIG. 1. As noted above, each mixer outputs multiple frequency components which satisfy the equation $f_{IF}=|mf_{RF} \pm nf_{LO}|$. In evaluating the frequency response of the foregoing circuit, it is necessary to determine the extent to which intermodulation products will present problems. This evaluation enables the identification of interfering signals in the RF signal which may combine and pass through the mixers, thereby creating interference. The following equation is utilized to identify the frequencies at which the intermodulation products will result:

$$f_{SP}=(f_{IM}\pm f_{LO}M)/N;$$

where $f_{SP}$ represents the frequency at which the intermodulation product occurs, $f_{IM}$ represents the intermediate frequency output by the mixer and selected by the IF filter; $f_{LO}$ represents the local oscillator frequency supply to the mixer; and M and N represent any integer. The integers M and N are added to provide the order of the intermodulation product. Table 1 below illustrates some of the first ten orders of spurious frequency responses for the foregoing circuit.

TABLE 1

| M | N | (28 − 1604M)/N | (28 + 1604M)/N |
|---|---|---|---|
| 1 | 1 | 1576 | 1632 |
| 2 | 1 | 3180 | 3236 |
| 2 | 2 | 1590 | 1618 |
| 3 | 2 | 2392 | 2420 |
| 3 | 3 | 1595 | 1613 |
| 4 | 3 | 2129 | 2148 |
| 4 | 4 | 1597 | 1611 |
| 5 | 4 | 1998 | 2012 |
| 5 | 5 | 1598 | 1610 |

As illustrated in the example of the above table, the carrier frequency of the incoming signal equals 1575.420 MHz while the local oscillator produces a signal having a frequency of 16.368 MHz. The local oscillator frequency is increased by a factor of 49 to a frequency of 802.032 MHz and then again increased by a factor of 2 to 1604.064 MHz before being mixed with the incoming RF signal to produce an intermediate frequency of 28.644 MHz. The intermediate frequency is again mixed with the original signal from the local oscillator to produce a base band signal equalling 12.276 MHz. As shown in Table 1, the IPs occur either extremely close to the RF signal frequency or at substantially higher frequencies. Consequently, those IPs extremely close correspond to frequencies which are limited from use by regulation. Hence, very little interference occurs at these frequencies.

Turning to FIG. 3, the horizontal axis corresponds to the input frequency $f_{RF}$ and the vertical axis corresponds to the order of the intermodulation product. Within FIG. 3, the vertical lines represent intermodulation products, including those from Table 1, whose height identifies the intermodulation order (IP). The order of the intermodulation products has been identified in descending order from bottom to top since lower order intermodulation products create more problems than higher order IPs. GPS receivers are primarily concerned with IPs having an order of up to 12. As illustrated, the lines are in clusters of five, representing five frequencies distributed evenly across the first intermediate frequency bandwidth (10 MHz). The diagonal lines 50 represent the bandwidth of the incoming signal. The diagonal lines 60 represent the bandwidth of the image signal which may also be passed by the first mixer. A single vertical line 65 represents the local oscillator frequency utilized by the first mixer after it has been increased by the desired factor (98 in the present embodiment). The image band 60 and the receive band 50 are located equal distance from and on opposite sides of the local oscillator frequency 65. The region generally designated by the numeral 70 illustrates the IPs occurring substantially close to, if not overlapping, the pass band. The frequencies identified in regions 75 and 76 are easily filtered out and thus of little consequence.

Alternatively, the present invention may be constructed from a slightly different converter design. By way of example, an additional multiplier may be inserted in series with the multipliers 22 and 28, with this additional multiplier doubling the frequency of the received signal. This X2 multiplier would prevent the need for doubling the frequency of the LO signal within the mixer 16. In this alternative embodiment, the local oscillator 20 would continue to output a signal of approximately 16 MHz, with the frequency of this oscillator signal being increased by a factor of 98 within 3 multipliers (i.e. X7, X7 and X2). The resulting LO signal output by the amplifier 32 would have a frequency of approximately 1604 MHz. In this alternative embodiment, the output of the local oscillator 20 would still be delivered as the second LO signal to the second mixer 40.

As a third alternative, the multipliers 22 and 28, band pass filters 24 and 30 and amplifiers 26 and 32 may be omitted and a phase locked loop circuit substituted therefore, so long as this phase locked loop supplies the first and second LO signals as explained above. This phase locked loop, by way of example, comprises a voltage controlled oscillator 220 delivering an output signal of 802.032 MHz as the LO signal is delivered directly to the doubling mixer 16. The frequency of the LO signal is doubled within the mixer 16 to 1604.064 MHz prior to mixing with the RF frequency. The output of the voltage controlled oscillator 220 is further delivered to a division circuit which reduces the voltage controlled oscillator's output to the second LO signal (approximately 16 MHz). The division circuit includes two divide by 7 circuits 232, 238 connected in series to properly reduce the output frequency of the voltage controlled oscillator 220 to 16.368 MHz. The output of the division circuit is supplied to a phase detector 240. A second oscillator 242, having a frequency of 16.368 MHz, supplies a reference signal to the phase detector 240. The phase detector compares the output of the division circuit with the output of the second oscillator 240 and delivers a voltage controlling signal to the voltage controlled oscillator 220 to adjust the output frequency thereof based on this comparison to effect a phase locked loop. The output of the dividers is further supplied to the second mixer 40 as the second LO signal.

While these alternative embodiments may be utilized to provide the frequency response described in connection with the first embodiment, the first embodiment is deemed preferable as it requires less power, simpler components and is cheaper to manufacture.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A GPS frequency converter comprising:

input means for receiving an input signal having an RF frequency and modulated by a code at a preset code rate, said RF frequency being greater than 1000 MHz;

means for producing a first LO signal having a LO frequency, said LO frequency being greater than said RF frequency by a non-zero multiple of a sampling rate, at which said input signal is sampled, plus or minus a non-zero multiple of said code rate; and first mixer means for receiving said input and first LO signals and for outputting a first intermediate signal having a first IF frequency equaling a difference between said LO and RF frequencies, said difference being less than 30 MHz.

2. A GPS frequency converter, according to claim 1, further comprising:

an oscillator; and second mixer means for receiving said first intermediate signal and an output signal of said oscillator, said output signal of said oscillator having a frequency less than said first IF frequency of said first intermediate signal, and for producing a base band signal therefrom having a frequency equaling a difference between said first IF frequency and said frequency of said output signal of said oscillator.

3. A GPS frequency converter, according to claim 1, wherein said means for producing a first local oscillator signal comprises:

a local oscillator for producing an output having a local oscillator signal, said local oscillator signal having a frequency equaling a multiple of said sampling rate; and multiplier means for receiving said output of said local oscillator and for outputting said first LO signal based thereon and having said LO frequency.

4. A GPS frequency converter, according to claim 3, wherein said LO frequency is at least 49 times greater than said frequency of said local oscillator signal of said local oscillator output.

5. A GPS frequency converter, according to claim 1, wherein said means for producing a first LO signal comprises:

a local oscillator; and first and second multiplier means for increasing a frequency of an output signal from said local oscillator separately by factors of 7 to produce said LO frequency.

6. A GPS frequency converter, according to claim 1, wherein said first mixer means increases said LO frequency of said first LO signal by a factor of 2 before combining said LO signal and said RF signal to produce said first intermediate signal having said first IF frequency.

7. A GPS frequency converter, according to claim 1, wherein said RF frequency is approximately 1575 MHz and said sampling rate is approximately 16 MHz.

8. A GPS frequency converter, according to claim 1, wherein said LO frequency equals approximately 1604 MHz.

9. A GPS frequency converter, according to claim 1, wherein said first IF frequency equals one of approximately 12 MHz, 20 MHz and 28 MHz.

10. A GPS frequency converter, according to claim 1, wherein said first intermediate signal is a base band signal output by said converter, said base band signal has a frequency equaling $(F_s*N)\pm(F_s/4)$; wherein N is an integer greater than or equal to 1 and $F_s$ is a rate at which the base band signal is sampled.

11. A GPS frequency converter, according to claim 1, wherein said RF frequency of said input signal is 1575.42 MHz.

12. A GPS frequency converter comprising:

input means for receiving an input signal, said input signal being an RF signal having an RF frequency and modulated by a C/A code having a chipping rate of $f_O$;

means for producing a first LO signal having a first LO frequency equaling 98 times a sampling reference frequency of $16*f_O$; and first mixing means for receiving said first LO signal and said RF signal and for producing a first IF signal having a IF frequency substantially equal to $28*f_O$.

13. A GPS frequency converter, according to claim 12, further comprising:

second mixing means for mixing said first IF signal with a second LO signal having a frequency of $16*f_O$ to produce a second IF signal having a second IF frequency equalling approximately $12*f_O$.

14. A GPS frequency converter, according to claim 12, wherein said first LO signal is generated by a frequency multiplier chain including two 7× multipliers and a 2× multiplier to increase said sampling reference frequency by 98 times.

15. A GPS frequency converter, according to claim 12, wherein said first LO signal is generated by a frequency multiplier chain utilizing a plurality of multipliers to increase said sampling reference frequency by 98 times.

16. A GPS frequency converter, according to claim 12, further comprising:

a phase locked looped frequency circuit for generating said first LO signal.

17. A GPS frequency converter, according to claim 13, further comprising:

a chase locked looped frequency circuit for generating said first LO signal and said second LO signal, wherein said phase locked looped frequency circuit utilizes a plurality of frequency dividers to generate said second LO signal by reducing said first LO frequency to said frequency of said second LO signal.

18. A GPS frequency converter, according to claim 16, wherein said phase locked looped frequency circuit includes a plurality of dividers for producing said first LO frequency from a base reference frequency.

19. A GPS frequency converter, according to claim 12, wherein said first IF signal is a base band signal output by said converter, said base band signal has a frequency equaling $(F_s*N)\pm(F_s/4)$; wherein N is an integer greater than or equal to 1 and $F_s$ is a rate at which the IF signal is sampled.

* * * * *